Patented Mar. 23, 1954

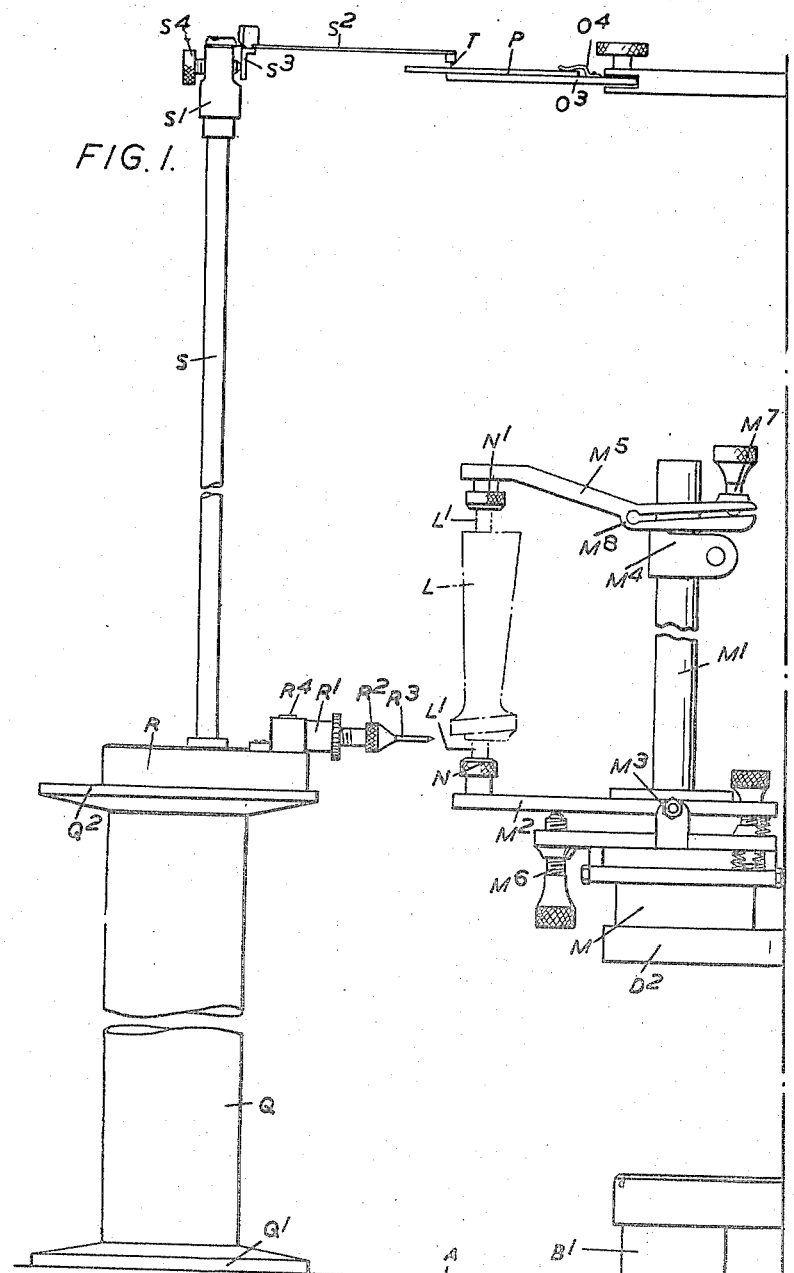

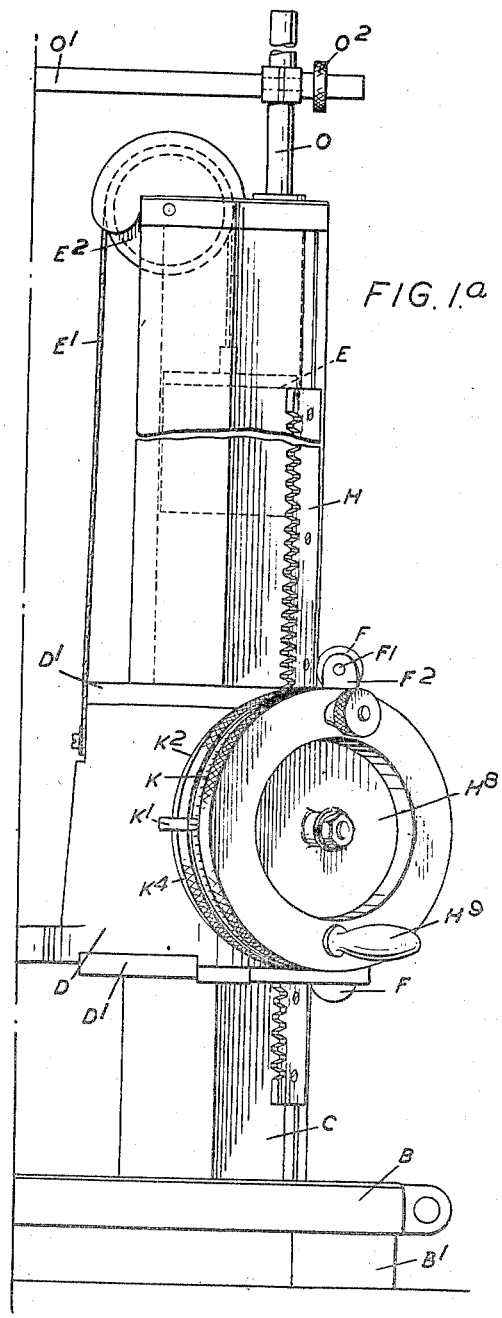
FIG. 1.a

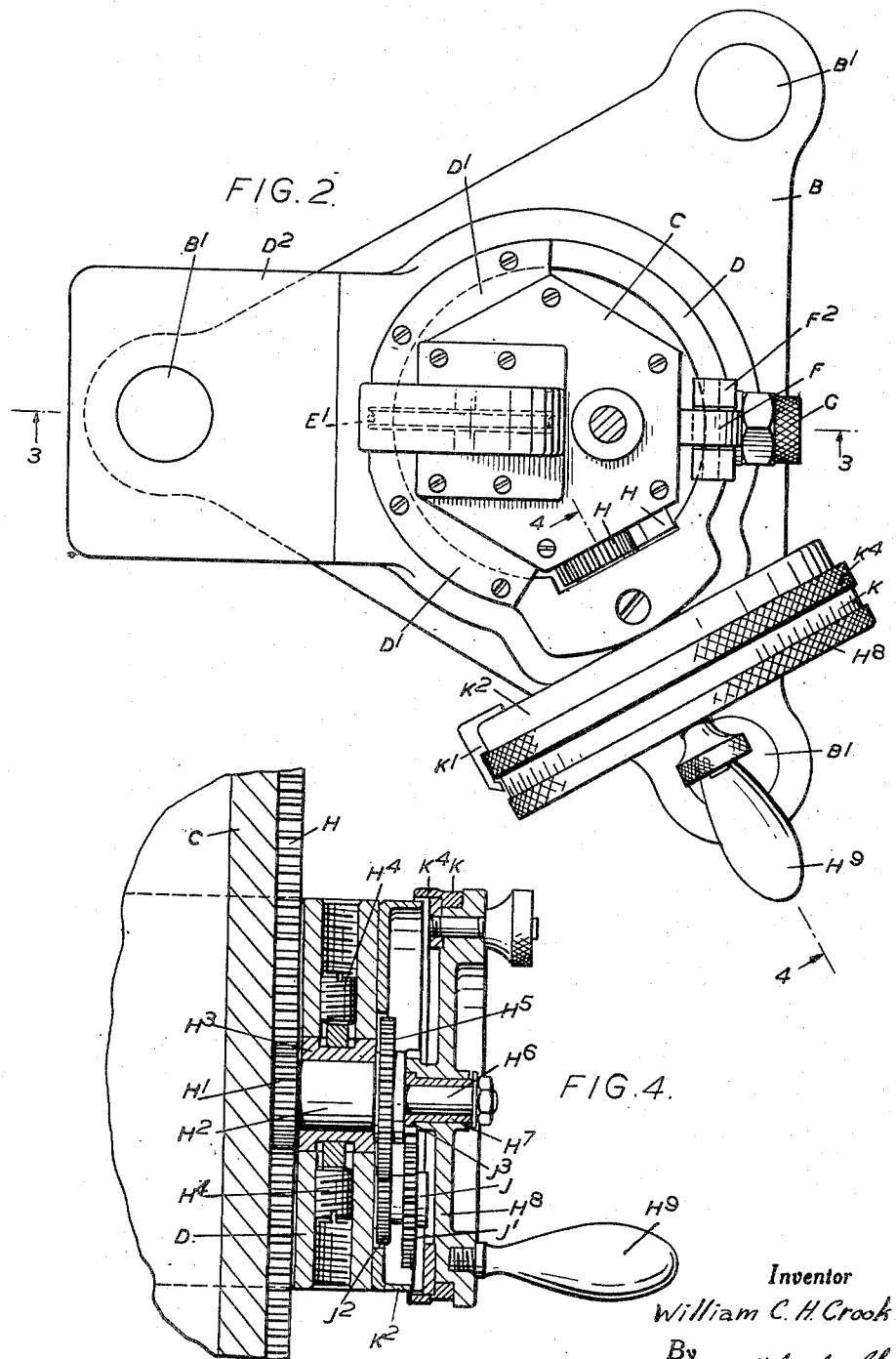

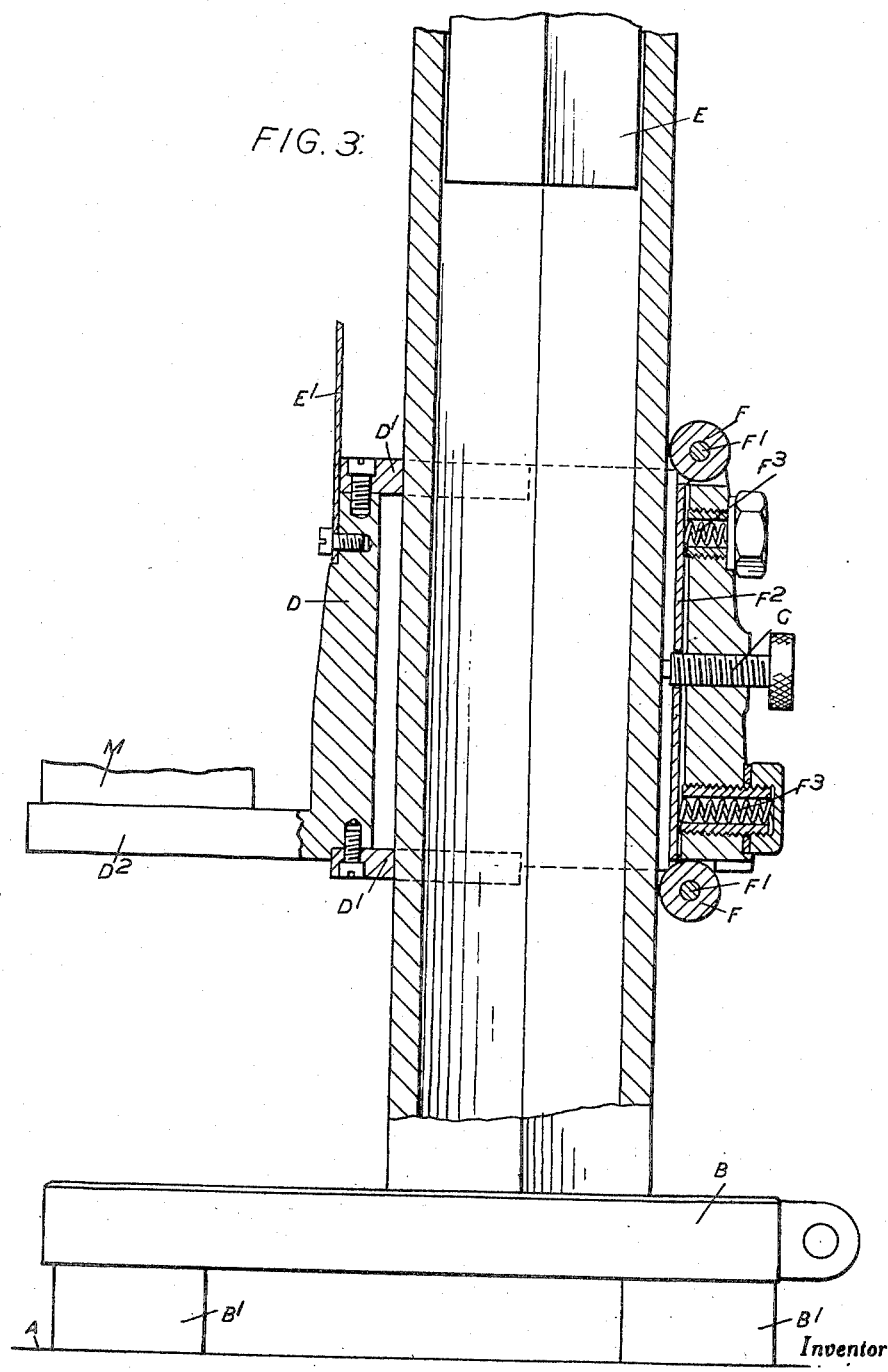

2,672,690

UNITED STATES PATENT OFFICE 2,672,690

APPARATUS FOR TRACING THE PROFILES OF DEVICES

William Charles Herbert Crook, Hounslow, England, assignor to D. Napier & Son Limited, London, England, a British company Application June 12, 1950, Serial No. 167,651

Claims priority, application Great Britain June 27, 1949

1 Claim. (Cl. 33—24)

This invention relates to apparatus for tracing profiles upon a flat surface for example for the purpose of determining the exact profile of a part in a given plane, for checking the correctness of such profiles or for other purposes and is particularly but not exclusively applicable to apparatus for tracing a profile upon a plate so that the profile can be optically projected on to a screen.

The object of the invention is to provide apparatus which will be simple and accurate for tracing the profile of a part in a given plane upon a flat surface.

Apparatus for tracing a profile upon a flat surface according to the present invention comprises a base, hereinafter for convenience called a scribing block, movable upon a plane surface and carrying two vertically displaced points one of which (hereinafter called the profile-following point) is arranged to engage and be moved over the surface of the article of which the profile in a plane is to be traced by a movement of the scribing block over the plane surface while such article is held stationary, while the other constitutes a scribing point adapted to trace said profile on a flat surface (hereinafter called the scribing surface) parallel to the plane surface, the two points lying or being capable of being caused to lie on the same vertical line normal to the plane surface.

The scribing surface may be for example a glass plate coated on the face on which the scribing point bears with lamp black or other thin opaque coating in which a line representing the profile is made by the scribing point. It will be seen that the glass plate can then be used for the optical projection, the line being transparent while the rest of the surface is opaque.

Preferably a support for the scribing block is provided comprising a member on which the scribing block rests freely adapted to be gripped by the hand and having a lower surface which rests upon the plane surface and an upper surface parallel to the lower surface on which the scribing block rests so that the scribing block can be moved to cause movement of the profile-following point over the surface of which the profile is to be traced by moving the support and yet the pressure with which the said profile-following point can be caused to bear upon the profiled surface is limited to that represented by the friction between the scribing block and its support.

Such a support may resemble a bobbin, that is to say, may have comparatively large diameter ends resembling flanges on which the upper and lower surfaces are formed and a small diameter intermediate part to be gripped by the hand.

The means for supporting the article of which the profile is to be traced may vary but preferably are arranged to support the article upon a vertical axis and include means for moving the article bodily along the said vertical axis thus enabling the profile of the article in horizontal planes at various vertical positions to be traced.

In any case the profile following point is preferably adjustable in a horizontal plane relatively to the scribing block so as to enable it to be brought exactly on to the vertical line containing the scribing point, while the scribing point, which may also be vertically adjustable, is conveniently carried on a light leaf spring which when correctly adjusted maintains it in contact with the scribing surface.

The invention may be carried into practice in various ways but one construction according to the invention is illustrated by way of example in the accompanying drawings, in which Figure 1 is a side elevation of the invention as arranged for tracing the profile of a turbine blade; and Fig. 1a is a side elevation of apparatus for supporting the turbine blade and scribing surface; Figures 1 and 1a together showing the complete apparatus, Figure 2 is a plan view of one part of the apparatus shown in Figure 1, Figure 3 is a side elevation on an enlarged scale and partly in section on the line 3—3 of Figure 2, and Figure 4 is a cross section on the line 4—4 of Figure 2.

The apparatus illustrated is used upon the accurate surface of a face plate indicated at A and comprises adjustable supporting mechanism for supporting the article of which the profile is to be traced and scribing apparatus.

The adjustable supporting mechanism comprises a base B having three feet in the form of metal beds $B^1$ which rest upon the surface of the face plate A, one or more of the feet conveniently being adjustable in known manner to ensure that the base B lies exactly parallel to the surface of the face plate A. Rigidly supported upon the base B is a vertical pillar C of hexagonal cross section, this pillar being hollow and having mounted thereon a slide indicated generally at D which can move vertically upon but not rotate relatively to the pillar and is conveniently counter-weighted by a weight E freely disposed within the pillar and connected to the slide D by a flexible cable or strip $E^1$ passing over a pulley $E^2$ at the upper end of the pillar C.

The slide D is accurately located with respect to the pillar by means of two plates $D^1$ secured respectively to its upper and lower ends and having inner surfaces which conform exactly to the three adjacent faces of the hexagonal pillar C as shown most clearly in Figures 2 and 3, the engaging surfaces of the plates $D^1$ and of the pillar being held in close contact by two rollers F mounted to rotate on horizontal pins $F^1$ which are carried by opposite ends of a pressure plate $F^2$ located in the bore of the slide D as shown in Figure 3 and acted upon by two compression springs $F^3$ located in housings in the slide D.

Thus it will be seen that the rollers F are pressed by the springs $F^3$ into engagement with the face of the pillar C remote from the plates $D^1$ and thus serve to hold the plates $D^1$ in close engagement with the associated surfaces of the pillar while permitting the slide D as a whole to move vertically upon the pillar.

A locking screw G passes through a screwthreaded bore in the slide D as shown in Figures 2 and 3 and passes freely through the plate $F^2$ so as to act upon the pillar C and thus enable the slide D to be locked frictionally in any desired vertical position upon the pillar.

The slide D is provided with adjusting mechanism for moving it vertically upon the pillar C comprising a rack H rigidly secured to the pillar and engaged by a pinion $H^1$ mounted upon a spindle $H^2$ supported in a bearing $H^3$ carried in a bore in the slide D as best shown in Figure 4, the bearing $H^3$ conveniently being secured in position by two set screws $H^4$. The spindle $H^2$ carries a second gear wheel $H^5$ and is also provided with an extension $H^6$ of reduced diameter forming a spindle on which is rotatably mounted by means of a bearing $H^7$, a hand wheel $H^8$ having a handle $H^9$.

Supported on a fixed spindle (not shown) carried by the slide D is a hollow lay shaft J carrying two gear wheels $J^1$, $J^2$ one of which meshes with the gear wheel $H^5$, while the other meshes with a gear wheel $J^3$ formed or mounted on the hand wheel $H^8$. It will thus be seen that the gearing above described constitutes a transmission train between the hand wheel $H^8$ and the gear wheel $H^1$ by which the latter gear wheel can be rotated and thus act through the rack H to cause vertical movement of the slide D upon the pillar C. The ratio of the transmission train is such as to provide a comparatively small degree of vertical movement of the slide D for one revolution of the hand wheel $H^8$. In the arrangement shown the hand wheel carries a scale indicated at K upon its rim with which cooperates a pointer $K^1$ rigidly secured to a flanged member $K^2$ which is secured to the slide D and serves, with a cooperating flanged member $K^4$ on which the scale K is formed, to enclose the gearing $J^1$, $J^2$, $J^3$, $H^5$. In one example the scale K is such that each division represents vertical movement of the slide D by $1/1000$ of an inch.

The slide D carries a laterally projecting platform $D^2$ on which is rigidly mounted a support for the article of which the profile is to be investigated, which in the example shown is a turbine blade L. The blade support comprises a base M secured to the platform $D^2$ and carrying a pillar $M^1$. Mounted upon the base M in an arm $M^2$ arranged to pivot about a horizontal axis $M^3$ while adjustably secured to the pillar $M^1$ is a slide $M^4$ having pivoted to it in an adjustable manner an arm $M^5$, the arms $M^2$ and $M^5$ carrying at their ends chuck or gripping members N, $N^1$ formed, for example with hard rubber inserts, to grip respectively the upper and lower ends of the blade L or projections $L^1$ thereon. The arm $M^2$ is spring loaded and has associated with it adjusting mechanism indicated generally at $M^6$ by which its position can be adjusted, while the upper arm $M^5$ is provided with means indicated at $M^7$ by which it can be caused to rock about the thin section indicated at $M^8$ so as to hold the blade L in place by compression between the members N and $N^1$.

It will thus be seen that by vertical adjustment of the slide D and individual adjustment of the arms $M^5$ and $M^2$, the blade L can be supported in any desired vertical position within the limits of adjustment.

Projecting from the upper end of the pillar C and rigidly secured to it is a vertical rod O on which is adjustably mounted a laterally extending arm $O^1$, the arm being secured to the rod O frictionally by means of a friction grip device having an adjustment screw $O^2$. The outer end of the arm $O^1$ has rigidly but adjustably secured to it a platform $O^3$ having spring clips $O^4$ by which a glass or like plate P constituting the scribing surface and supported thereon can be held frictionally from movement thereon, the arrangement being such that the plate P lies vertically over the blade L.

The scribing apparatus comprises a bobbinlike support Q with the lower face of the lower flange $Q^1$ and the upper face of the upper flange $Q^2$ truly parallel, forming a base supporting member. The lower face of the lower flange $Q^1$ rests upon the surface of the face plate A while mounted to slide freely upon the upper face of the upper flange is a scribing block or base R. Projecting laterally from the scribing block R is a support $R^1$ carrying an adjustable chuck $R^2$ carrying a pointed profile following pin $R^3$. The support $R^1$ is adjustable in a horizontal plane about a vertical supporting pin $R^4$ relatively to the scribing block, while the chuck $R^2$ is adjustable radially with respect to the pin $R^4$ relatively to the support $R^1$ so that the point of the pin $R^3$ can be caused to lie at a precise selected position in a horizontal plane relatively to the base R.

Supported from the base R is a post S the upper end of which has rigidly secured to it a supporting block $S^1$ to which is secured the inner end of a spring arm $S^2$ in the form of a leaf spring, the outer end of which has secured to it and projecting downwardly from it a scribing point T. The spring arm $S^2$ has secured to it adjacent to its inner end a lug $S^3$ acted upon by an adjacent screw $S^4$, whereby the spring arm $S^2$ can be flexed to adjust the vertical position of rest of the scribing point T.

The apparatus when adjusted for use is adjusted so that the scribing point T lies directly vertically above the point of the pin $R^3$, the scribing point T being adjusted so that it bears lightly upon the upper surface of the plate P which will generally be a glass plate having a surfacing of lamp black or other thin opaque substance which can be removed in a fine line by movement of the scribing point T over it.

In operation with the blade L mounted on the blade support, the slide D is adjusted until the horizontal plane in which the point of the pin $R^3$ lies cuts the blade L at the point in its length at which the cross sectional profile is to be investigated. The bobbin like base supporting member Q is now gripped and is moved so as to cause the scribing block or base R and hence the point R³ to pass in the said plane over the surface of the blade L. It will be seen that in such passage the profile of the blade will be accurately traced by the scribing point T upon the glass plate P and moreover that the pressure with which the point R³ bears upon the blade cannot exceed that represented by the friction between the upper face of the base supporting member Q and the scribing block or base R so that errors which might otherwise occur due to the point R³ being pressed against the blade L with excessive pressure are avoided.

In practice the procedure will usually be to trace the profile of the transverse cross section of the blade either on the same plate P or on two or more separate plates at a selected number of predetermined points in the length of the blade so as to determine the accuracy or otherwise of the profile of the blade as a whole.

What I claim is:

Apparatus for tracing a profile on a flat surface comprising a base supporting member adapted to be moved by hand over a plane horizontal surface and having a lower surface which rests freely and slidably upon the plane horizontal surface and an upper surface parallel to the lower surface, the said base supporting member resembling in shape a bobbin by having relatively large diameter ends on which the upper and lower surfaces are formed, and an intermediate part of smaller diameter suitable for being gripped by the hand of an operator, a base formed with a lower surface which rests freely and slidably on the upper surface of the base supporting member, two vertically displaced points carried by the base, one of the points being arranged to engage and move over the surface of an article of which the profile is to be traced in a plane, while the other point constitutes a scribing point arranged to trace said profile on a horizontal flat surface, the two points being arranged to lie on the same vertical line.

WILLIAM CHARLES HERBERT CROOK.

References Cited in the file of this patent

UNITED STATES PATENTS

| Number | Name | Date |
|---|---|---|
| 2,352,695 | Clausing et al. | July 4, 1944 |
| 2,368,853 | Levaggi | Feb. 6, 1945 |
| 2,468,995 | Morrison | May 3, 1949 |

FOREIGN PATENTS

| Number | Country | Date |
|---|---|---|
| 47,672 | Sweden | Sept. 1, 1920 |
| 492,948 | Germany | Mar. 1, 1930 |
| 176,006 | Switzerland | June 1, 1935 |
| 616,759 | Great Britain | Jan. 26, 1949 |
| 616,970 | Great Britain | Jan. 31, 1949 |